Dec. 3, 1968 W. A. LACHER 3,414,799

LOW LEVEL POLAR SIGNAL CONVERTER FOR PRINTER APPARATUS

Filed Dec. 9, 1966 2 Sheets-Sheet 1

INVENTOR.
WILLIAM A. LACHER

BY George L. Kensinger
ATTORNEY

LOW LEVEL POLAR SIGNAL CONVERTER FOR PRINTER APPARATUS

Filed Dec. 9, 1966

INVENTOR.
WILLIAM A. LACHER
BY George L. Kensinger
ATTORNEY

United States Patent Office 3,414,799
Patented Dec. 3, 1968

3,414,799
LOW LEVEL POLAR SIGNAL CONVERTER FOR PRINTER APPARATUS

William A. Lacher, North Wales, Pa., assignor to Burroughs Corporation, Detroit, Mich., a corporation of Michigan Filed Dec. 9, 1966, Ser. No. 600,423
12 Claims. (Cl. 321—2)

ABSTRACT OF THE DISCLOSURE

Apparatus for converting low voltage, low current signals into signals of higher current and higher voltage for the control of remote printing apparatus requiring no independent power supply and including switch means which is responsive to polar input signals referenced to an arbitrarily selected potential on a common input line and which is highly sensitive to voltage changes near the reference potential regardless of the degree to which the input signal waveforms are sloped or become deteriorated, as will be further explained below.

*Background of the invention*

Figure 1:
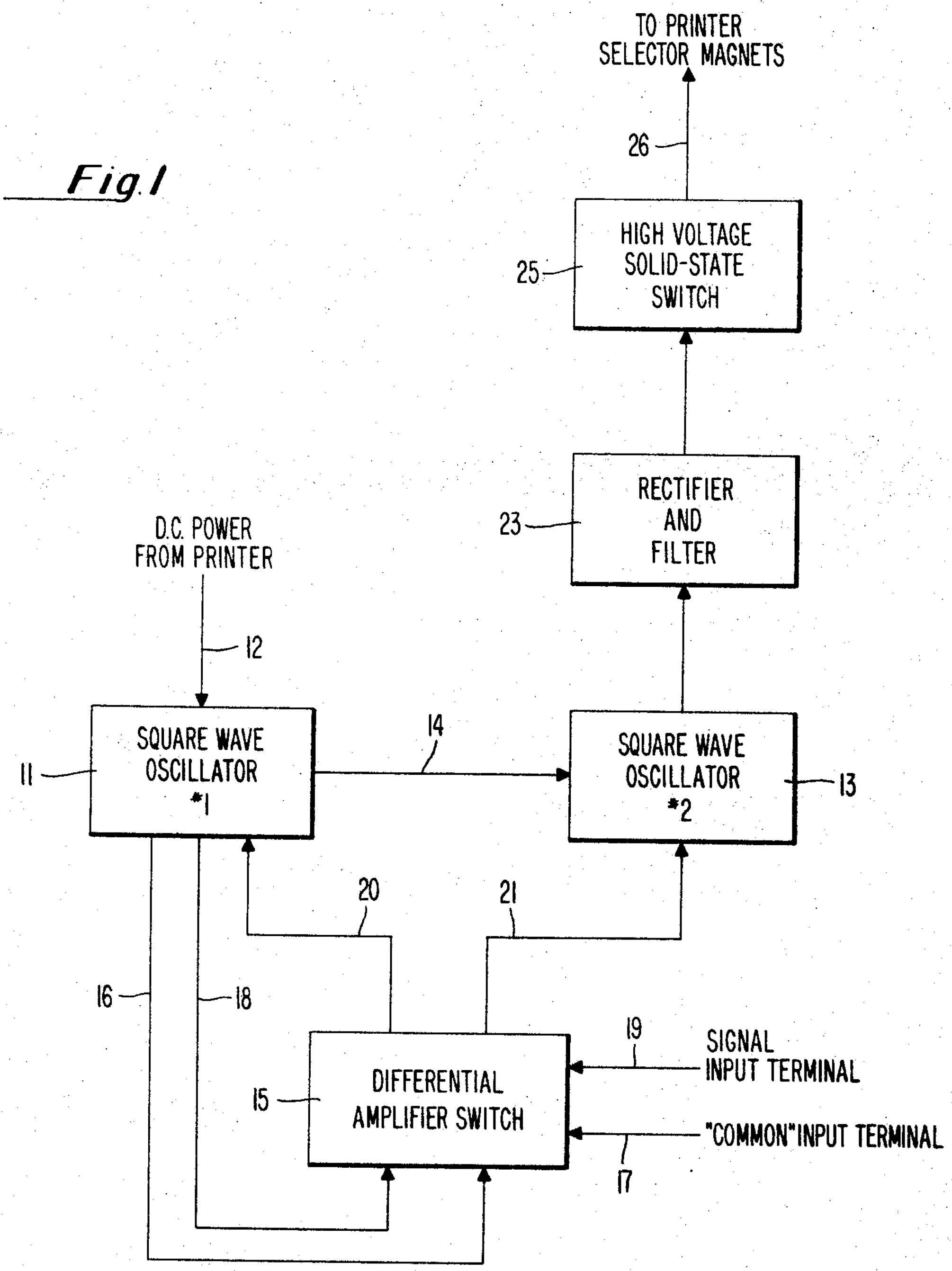

The invention relates to data communications systems incorporating signal responsive teletypewriting machines such as electronic data processing systems which utilize such machines as output data communication devices. More particularly, the subject invention relates to highly sensitive signal converters for developing binary signals of appropriate level for operating teletypewriting page printers responsive to low level polar input signals.

Recent developments in communications systems and data processing systems have resulted in new requirements as to the sensitivity of teletypewriting machines and printers to input signal levels and in the requirement that such apparatus be made to respond to polar input signals. Recently promulgated signal transmission standards have required that such printers be made responsive to polar signals of low voltage and low current magnitudes and that they be made capable of responding to input signals having intentionally sloped waveforms or waveforms which have deteriorated in transmission.

One important reason for such printers to be made responsive to low level input signals is for minimizing the electromagnetic radiation emanated from transmission lines employed for connecting such printers to a communications system. This is desired in order to prevent or render much more difficult any unauthorized capacitive or inductive monitoring or "wire-tapping" of the transmission lines, as well as to reduce the generation of electromagnetic noise fields and signals in the system. The low amount of electromagnetic radiation generated by electrical signals of low amplitude is much more difficult to monitor than that arising from the signals formerly utilized in such communications networks. The use of polar signals referenced to an arbitrarily chosen reference potential on a common input line also improves the security of such systems since possible "ground-loops" which might arise in such systems if signals were referenced to ground could also be monitored by unauthorized personnel desiring to "wire-tap" the line or eavesdrop on the information being transmitted.

It is desirable for such printer apparatus to be made highly sensitive to signal voltage changes in the vicinity of a reference potential on a common input line in order to permit the transmission of intentionally sloped control signal waveforms for further reducing the electromagnetic radiation emanated in such a system. High sensitivity to voltage changes near the reference potential also permits the utilization of longer transmission lines, thereby allowing remote printers to be dispersed geographically at greater distances from the source or generator of such signals, and eliminates the need for pulse-shaping or regeneration of the signal waveforms transmitted in such a system. The use of long transmission lines in communications systems which tends to result in deterioration of the waveshape of transmitted control signals and the intentional sloping of control signal waveforms both require that the teletypewriting printer apparatus be made capable of responding to slowly changing voltage variations near the reference potential.

An additional reason for making such printer apparatus responsive to bi-polar input or control signals is to render the communications system more immune to noise signals. In a polar signal system only the voltage excursions which overcome the difference between the queiscent voltage level and the reference potential will result in operation of the system. This renders ineffective the great majority of noise signals in the system. The use of bi-polar control signals also provides the advantage that any stray capacity which may exist in the system will be driven both when being charged and when becoming discharged rather than discharge being effected at a rate dependent only upon leakage resistance paths which may exist in the system. Thus, the rise and fall times of the signal waveforms may be controlled for compromising between the amount of electromagnetic radiation that will be generated in the system and the limitations on the frequency of operation that will be tolerated.

Furthermore, as a result of the large number of teletypewriting machines presently in use, a need has arisen for a plug-in type converter which is simple, low in cost, easy to install, and requires no separate or independent power supply for operation thereof. Such a plug-in converter should also be easy to replace for ease in maintenance of the system.

*Summary of the invention*

Accordingly, it is an object of the subject invention to provide apparatus for converting low level polar input signals into signals of higher current and voltage for the control of remote printing apparatus in communications systems and data processing systems.

Another object of the present invention is to provide signal converter apparatus responsive to polar signals referenced to an arbitrarily selected potential on a common input line and highly sensitive to voltage changes near the reference potential regardless of the shape of the input signal waveforms.

A further object of the present invention is to provide simple, low cost, easily installed and removed, plug-in type converter apparatus for use with presently available teletypewriting machines such as those produced under the trademark "Teletypewriter" for enabling the same to respond to low level polar signals referenced to an arbitrarily selected potential on a common input line.

In accordance with the above-stated needs in communications and data processing systems and in accordance with the above-stated objects, the present invention provides a low level polar signal converter for printer apparatus incorporating first and second square wave oscillators, the first oscillator being connected for receiving direct current power from the printer apparatus, differential amplifier switch means having input terminals for receiving polar input signals and being coupled between the first and second square wave oscillators for transmitting power from the first oscillator to the second oscillator in response to an input signal of a given polarity, rectifier means connected for receiving the output of the second square wave oscillator, and high voltage switch means responsive to signals from said rectifier means for developing signals for controlling the printer apparatus as a function of the polar input signals received by the switch means.

Figure 2:
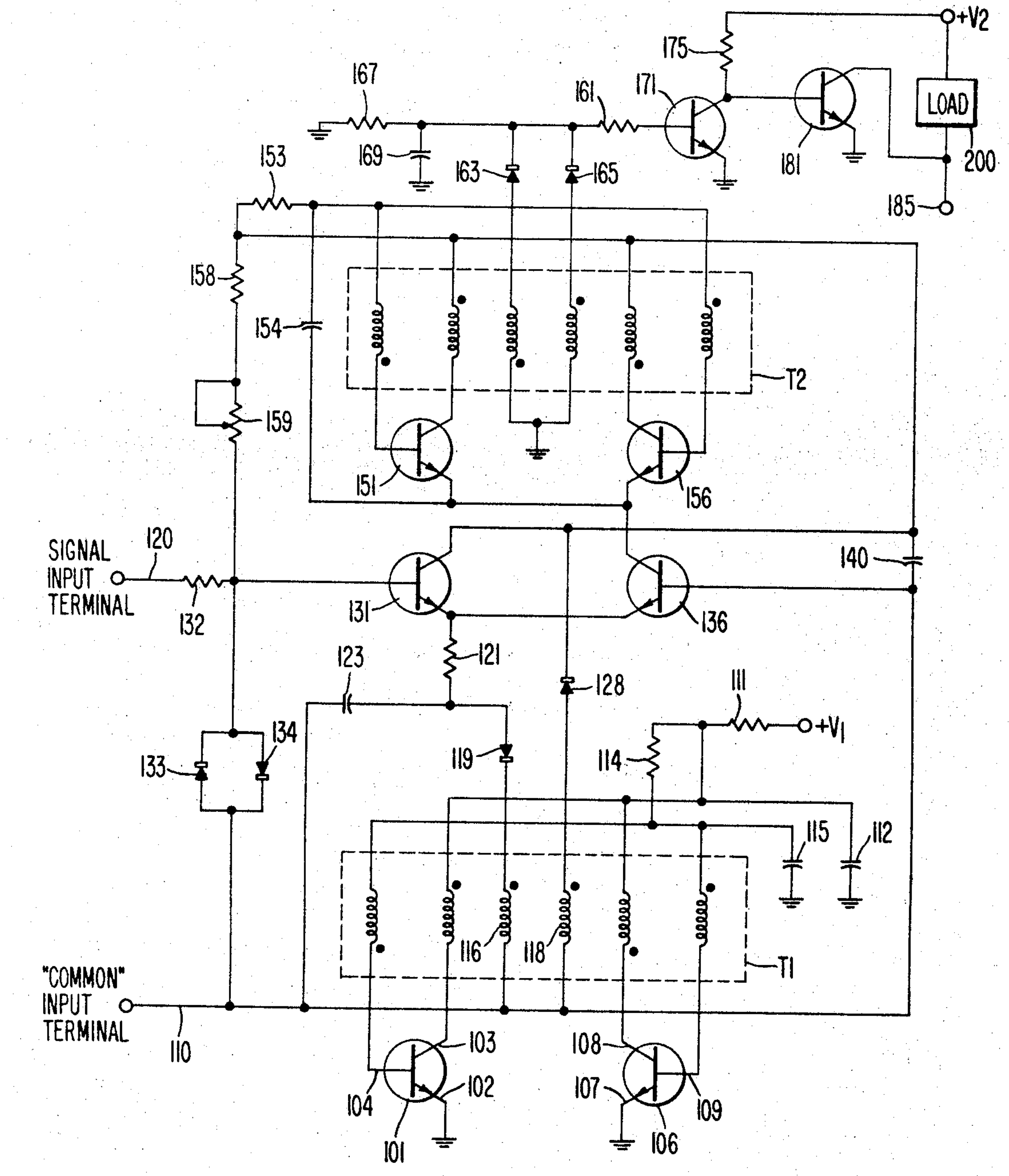

Further objects and advantages of the subject invention, together with many of the attendant advantages and features thereof, will become obvious from the following detailed description of the invention when carefully considered with reference to the accompanying drawings wherein:

FIGURE 1 is an electrical schematic block diagram of an embodiment of the signal converter of the subject invention, and FIGURE 2 is an electrical schematic circuit diagram of the preferred embodiment of the signal converter apparatus of the present invention.

*Description of the preferred embodiments*

Referring more particularly to the electrical schematic block diagram of FIGURE 1, a first square wave oscillator 11 is connected for receiving DC power over conductor 12 from a printer such as a teletypewriting machine with which the signal converter is utilized. One voltage developed by the first oscillator is delivered to a second square wave oscillator 13 over conductor 14 and to differential amplifier switch 15 over conductor 16. A second voltage is developed by the first oscillator and transmitted over conductor 18 also to the differential amplifier switch 15.

Differential amplifier switch 15 has a "common" input terminal 17 and a signal input terminal 19 for receiving polar input signals from a transmission line such as a twisted pair in a data communications or processing system, which may be shielded by a grounded sheathing (not shown). Upon the receipt of a signal of a given polarity on the input terminals, the second voltage developed by the first square wave oscillator is transmitted to the second square wave oscillator over conductor 21 by the differential amplifier switch. In the absence of such a signal the second voltage remains within the loop comprising the first square wave oscillator, conductor 18, differential amplifier switch 15 and conductor 20.

Upon the application of voltage levels upon both conductors 14 and 21, second square wave oscillator 13 develops an output signal which, after being rectified and filtered in component 23, is transmitted to high voltage solid-state switch 25, the output of which is delivered to the printer selector magnets via conductor 26 for controlling the operation of the printer apparatus. The output signal developed on conductor 26 will be of sufficient voltage and current magnitude for operating the selector magnets of the printing machine, responsive to low level polar input signals received on input terminals 17 and 19 of the signal converter of the invention.

Half-wave rectifying means may be incorporated in the first square wave oscillator for developing the positive and negative voltage outputs therefrom for application to the second square wave oscillator 13. One polarity voltage is delivered directly to the second square wave oscillator over conductor 14, the other being delivered via conductor 21 under control of the differential amplifier switch 15, responsive to input signals received on input terminals 17 and 19. Components 11, 13, 15, 23 and 25 may be selected from any of the appropriate devices known in the art and the oscillators and switches may be construed of either semi-conductor elements or vacuum tube switching means.

Referring more particularly to the electrical schematic circuit diagram of the invention in FIGURE 2, a first square wave oscillator is comprised generally of NPN transistors 101 and 106 and the primary and secondary windings of transformer T1. A DC voltage is applied between the $+V_1$ terminal and the emitter electrodes 102 and 107 of the transistors, which are grounded. Resistor 111 connects the $+V_1$ terminal to one end of the primary windings of the transformer, the other ends of which are connected individually to the collectors 103 and 108, respectively, of the oscillator transistors as shown. Grounded capacitor 112 is connected between the junction of the T1 primary windings and resistor 111 and ground. Resistor 114 connects this junction to one end of a pair of transformer T1 windings, the other ends of which are individually connected to the base electrodes 104 and 109, respectively, of the oscillator transistors, and to one plate of capacitor 115, the other end of which is grounded.

T1 secondary winding 116 is connected between the common input line 110 and the cathode of diode 119, the anode of which is connected to one end of emitter resistor 121 and to one plate of capacitor 123. T1 secondary winding 118 is connected between the common line 110 and the anode of diode 128. The other plate of capacitor 123 is connected to the common input and the other end of resistor 121 is connected to the emitters of NPN transistors 131 and 136 of the differential amplifier switch. The base electrode of transistor 131 is connected to the signal input terminal through series input resistor 132. A pair of oppositely-poled diodes 133 and 134 are connected in parallel and are connected between the base electrode of transistor 131 and the common input terminal 110. The base electrode of transistor 136 is connected to common input line 110 and to one plate of capacitor 140.

A second square wave oscillator is comprised generally of NPN transistors 151 and 156 and the primary and secondary windings of transformer T2. The T2 primary windings are individually connected at one end to the collectors of transistors 151 and 156 and at the other end to the other plate of capacitor 140. The collector of differential amplifier switch transistor 131 and the cathode of diode 128 are also connected to the other plate of capacitor 140. The other plate of capacitor 140 is also coupled to the bases of transistors 151 and 156 through resistor 153 and through individual T2 windings and to the emitters of transistors 151 and 156 through capacitor 154, as well as to the base of transistor 131 through resistor 158 and potentiometer 159. The resistance setting of potentiometer 159 establishes the signal level of the converter output at terminal 185 should the input transmission line to the printer apparatus become broken, by assuring conduction of one of switch transistors 131 and 136. This will prevent continued operation of the printer or typewriting machine upon a break in one of the input lines.

The emitters of the second square wave oscillator transistors 151 and 156 are connected to the collector of differential amplifier switch transistor 136. The oppositely-wound secondary windings of transformer T2 are connected between ground and one end of base input resistor 161 through individual diodes 163 and 165 as shown. Also connected to the base of transistor 171 through input resistor 161 are grounded resistor 167 and grounded capacitor 169. The emitter of inverting amplifier transistor 171 is grounded and its collector is connected to the base of inverting amplifier transistor 181 and to a source of positive potential V2 through resistor 175.

The emitter of output amplifier transistor 181 is grounded and its collector is adapted to be connected to solenoid or magnet windings of printer apparatus represented as load 200 which may be connected at the other end to the source of positive voltage $+V_2$. All of the ground terminals shown in the electrical schematic circuit diagram are connected in common to the chassis ground of the printer apparatus. Converters for additional printers may be connected either in parallel to terminals 110 and 120 or may each be connected in common to input terminal 110. The relative winding directions of the windings of both transformers are indicated by a well-known drawing convention.

The circuit of the inverter responds to polar signals received on the signal input terminal 120 with respect to a reference potential existing on the common input terminal 110. When the voltage level on the signal input terminal is negative with respect to the common input terminal, then transistor 136 of the differential amplifier conducts and the other differential amplifier transistor 131 becomes nonconductive whereupon a circuit is established for, and bias potential is applied to, the second square wave oscillator transistors 151 and 156 which conduct and generate output waveforms which are full-wave rectified by diodes 163 and 165 and applied to the base of amplifier transistor 171 which drives that transistor and renders transistor 181 non-conductive, which deactivates the solenoid windings of the printer apparatus. If the voltage signal level on the signal input terminal is sufficiently positive with respect to the common input terminal, transistor 131 of the differential amplifier switch conducts and the other differential amplifier switch transistor 136 becomes nonductive, which prevents operation of the second square wave oscillator transistors 151 and 156 and amplifier transistor 171 and renders conductive output transistor 181 and provides a control signal for actuating the printer apparatus solenoid windings.

In the circuit shown, negative signals on the signals input terminal with respect to the reference potential on the common input terminal cause the circuit to become operative for driving the printer apparatus selector magnets. The differential amplifier switch, being extremely voltage sensitive, causes the circuit to become operative as soon as the input voltage level becomes negative with respect to the common input terminal, regardless of the slope or rise time of the leading or trailing edges of the input waveform. It is also noted that the input signal is received through input resistor 132 which was 5.1K ohms in the preferred embodiment which, in combination with the forward resistance of diodes 133 and 134, limited the input current to approximately one milliampere for an input voltage signal range between plus and minus six volts and assures switching of the differential amplifier transistors. It should also be noted that very high gain transistors can be employed or an additional amplifier could be inserted in the input line to the differential amplifier switch which could enable the circuit to respond to low level voltage signals of much lower current.

In the preferred embodiment which was constructed and operated the value of the components of the circuit were as follows:

| | | |
|---|---|---|
| **132** (R1) | ohms, ¼ watt | 5.1K |
| **158** (R2) | do | 10K |
| **159** (R3) (potentiometer) | do | 100K |
| **153** (R4) | do | 330K |
| **167** (R5) | do | 2.2K |
| **121** (R6) | do | 200K |
| **161** (R7) | do | 1K |
| **114** (R8) | do | 200 |
| **111** (R9) | ohm, 2 watt | 470 |
| **175** (R10) | ohm, 1 watt | 30K |
| (C1) | microfarads | 0.1 |
| (C2) | do | 47 |
| (C3) | do | 0.05 |
| (C4) | do | 4.7 |
| (C5) | do | 0.1 |
| (C6) | do | 47 |

The transformers employed had five-turn base windings, 20-turn primary windings connected to the oscillator transistor collectors and forty-turn secondary windings, although any appropriate turns ratio could be utilized. Commercially available transistors and semiconductor diodes may be employed or vacuum or gas tube equivalents. Although NPN transistors are used throughout the circuit, PNP type transistors could be utilized in their place provided that suitable reverse polarity voltages are supplied for biasing the circuit.

The function of diodes 133 and 134 is to clip the input signal waveforms in order to protect the base-emitter junctions of the differential amplifier switch transistors while assuring conduction thereof, which feature renders the circuit operable by a wide range of input voltage signals.

It is noted that diodes 119 and 128 connected to the output of the first square wave oscillator constitute a half-wave rectifier for the output square waves therefrom and could be replaced by any of the known half-waves rectifiers, which may include triode semiconductor or vacuum tubes, for example. Also, the full-wave rectifier comprising diodes 163 and 165 connected to the output of the second square wave oscillator could as well be replaced by any of the full-wave rectifiers known in the art. It is also noted that the low level polar signal converter of the present invention has utility for producing high level control signals in many applications other than for driving printer apparatus, and may be used in any application where such signal conversion is desired.

Although there has been shown and described only one generalized embodiment and only one specific embodiment of the low level polar signal converter of the subject invention, it will be apparent that many more embodiments of the present invention are possible without departing from the spirit of the invention. Therefore, while the preceding detailed description has been directed primarily to illustrative embodiments of the invention, it is not to be restricted thereby since obviously many modifications and variations of the invention are possible in the light of the above teachings. It is, therefore, to be understood that within the scope of the appended claims the invention may be practiced otherwise than as specifically described.

I claim:

1. A low level polar signal converted for electric apparatus, having an input terminal for serially receiving control signals and biasing means, comprising:
- first and second oscillators each having bias terminals for receiving energizing potential and output terminal means on which voltage waveforms are generated when the oscillator is energized, the bias terminals of said first oscillator being adapted for electrical connection to said biasing means;
- differential amplifier switch means electrically coupled between the output terminal means of said first oscillator and the bias terminals of said second oscillator and having a signal input terminal and a common input terminal;
- input means electrically connected to the signal input terminal and to the common input terminal of said differential amplifier switch means and having input terminals for receiving polar input signals; and
- output means electrically connected to the output terminal means of said second oscillator and adapted to be electrically coupled to the control terminal of the electric apparatus.

2. The polar signal converter of claim 1 wherein the output terminal means of the second oscillator comprises full-wave rectifier means coupled to electrical energy storage means.

3. The polar signal converter of claim 2 wherein the first and second oscillators are both free-running square-wave oscillators.

4. The polar signal converter of claim 2 wherein the output terminal means of the first oscillator comprises second rectifier means coupled to second electrical energy storage means.

5. The polar signal converter of claim 4 wherein the second rectifier means is a half-wave rectifier and has two output terminals, one of which is electrically connected to the differential amplifier switch means and the other of which is electrically connected to one of the bias terminals of the second oscillator and to the second electrical energy storage means.

6. The polar signal converter of claim 5 wherein a third electrical energy storage means is electrically connected to said one output terminal of the half-wave rectifier means.

7. The polar signal converter of claim 5 wherein the differential amplifier switch means comprises a pair of like conducting transistors, the emitters of which are electrically connected to said one output terminal of the half-wave rectifier; the base electrodes of which are individually electrically coupled to the signal input terminal and to the common input terminal, respectively; the collector of one is electrically connected to the other output terminal of the half-wave rectifier and the collector of the other is electrically connected to the other bias terminal of the second oscillator.

8. The polar signal converter of claim 7 further comprising resistance means for electrically connecting the emitters of the differential amplifier switch transistors to said one output terminal of the half-wave rectifier.

9. The polar signal converter of claim 7 wherein the input means comprises series-connected current-limiting means and voltage-clipping means electrically connected between the input terminals.

10. A polar signal converter according to claim 7 wherein second resistance means is electrically connected between the collector and base electrodes of said one differential amplifier switch transistor.

11. A polar signal converter according to claim 8 in which the first oscillator comprises a second pair of like-conductivity transistors and a transformer having winding means electrically connected to the base electrode and to a main current carrying terminal of each for receiving bias potential with the other current carrying terminal from the winding means and a pair of like-wound secondary windings electrically coupled to the half-wave rectifiers.

12. A polar signal converter according to claim 8 in which the second oscillator comprises a third pair of like-conductivity transistors and a second transformer having winding means electrically connected to the base electrode and to a main current carrying terminal of each for receiving bias potential from the first oscillator through the differential amplifier switch means and a pair of oppositely-wound secondary windings electrically coupled to the full-wave rectifier.

No references cited.

LEE T. HIX, *Primary Examiner.*

W. M. SHOOP, Jr., *Assistant Examiner.*